United States Patent [19]
Sawase et al.

[11] Patent Number: 6,014,231
[45] Date of Patent: *Jan. 11, 2000

[54] IMAGE SENSOR

[75] Inventors: Kensuke Sawase; Hiromi Ogata, both of Kyoto, Japan

[73] Assignee: Rohm Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/781,746

[22] Filed: Jan. 10, 1997

Related U.S. Application Data

[63] Continuation of application No. 07/942,227, Sep. 9, 1992, abandoned.

[51] Int. Cl.[7] .................................................. H04N 1/04
[52] U.S. Cl. ...................... 358/482; 358/474; 358/475; 250/208.1
[58] Field of Search .................................. 358/474, 475, 358/482, 483, 484; 250/208.1; H04N 1/04

[56] References Cited

U.S. PATENT DOCUMENTS

| | | | |
|---|---|---|---|
| 5,038,027 | 8/1991 | Ioka | 358/484 |
| 5,136,150 | 8/1992 | Fukushima et al. | 358/484 |
| 5,182,445 | 1/1993 | Yanashita | 250/208.1 |
| 5,194,725 | 3/1993 | Sawase et al. | 250/208.1 |
| 5,214,273 | 5/1993 | Yokochi | 358/484 |
| 5,477,329 | 12/1995 | Imamura et al. | 250/208.1 |
| 5,495,277 | 2/1996 | Imamura et al. | 250/208.1 |
| 5,579,114 | 11/1996 | Imamura | 358/482 |
| 5,780,840 | 7/1998 | Lee et al. | 358/482 |

FOREIGN PATENT DOCUMENTS 63-217870  9/1988  Japan .

*Primary Examiner*—Kim Yen Vu
*Attorney, Agent, or Firm*—Birch, Stewart, Kolasch, & Birch, LLP

[57] ABSTRACT

An image sensor comprises a light emitting element for emitting light to be irradiated onto the original document, a light receiving element for receiving the light reflected by the document, and a connector, all of which are mounted on the same base plate. The base plate is then mounted in a frame. Therefore, the image sensor can be produced through a reduced number of assembling steps and with a reduced dimension.

20 Claims, 5 Drawing Sheets

IMAGE SENSOR

This application is a continuation, of application Ser. No. 07/942,227 filed on Sep. 9, 1992, now abandoned.

FIELD OF THE INVENTION

The present invention relates to an image sensor usable as an image reader in facsimile machines and a facsimile machine using such an image sensor.

BACKGROUND

FIG. 1 of the accompany drawings shows an image sensor constructed in accordance with the prior art. The image sensor comprises a frame 12, a light source unit 17 mounted in the frame 12, a gradient index lens array 15 mounted in the frame 12 and commercially available under the trade name "SELFOC lens array", a light receiving unit 18 mounted in the frame horizontally at the inner bottom thereof, an external connector 19 extending outwardly from the frame 12 at one side, and a glass sheet 13 mounted on the frame 12 at the top.

The light source unit 17 comprises a base plate 17a and a light emitting diode (LED) 17b having a lens and mounted on the base plate 17a. The light source unit 17 is disposed inclined 45 degrees relative to a plane perpendicular to the longitudinal axis of the frame 12.

The light receiving unit 18 comprises a base plate 18a and a photosensor (e.g. photodiode array) 18b, in which an array of light receiving parts are disposed on the base plate 18a and extend in a direction perpendicular to the plane of FIG. 1.

The gradient index lens array 15 is supported within the frame 12 above the photosensor 18b.

The base plates 17a and 18a are electrically connected with the internal terminal of the connector 19 through leads (not shown).

Light emitted from the light source unit 17 irradiates an original document 20 with an angle of 45 degrees through the glass sheet 13 and is reflected by the document 20 toward the gradient index lens array 15. After passing through the gradient index lens array 15, the light is condensed onto the photosensor 18b wherein the light is converted into an electrical signal.

The image sensor of the prior art requires the light source 17 and light receiving units, 18 which are separately constructed and also the leads connecting these units 17, 18 with the connector 19. This makes it difficult to reduce the number of assembling steps and to decrease the manufacturing cost. Having these separate units prevents the entire size of the image sensor from being reduced.

SUMMARY OF THE INVENTION

It is therefore an object of the present invention to provide an image sensor which can be produced with a decreased number of assembling steps and also with a reduced size.

To this end, the present invention provides an image sensor for reading information on an original document by irradiating light onto the original document and converting the light reflected by the document into an electrical signal, the image sensor comprising a light emitting element for emitting light to be irradiated onto the original document, a light receiving element for receiving the light reflected by the document, and an external connector, all of which are mounted on the same base plate. Thus, the number of parts can be reduced as well as the cost, and the image sensor can be made small in size. When the base plate on which the light emitting element, light receiving element and external connector are mounted is mounted in a frame, the number of assembling steps can be reduced along with the reduction in the number of parts.

If the base plate is mounted in the frame with the base plate inclined relative to the optical axis of the optical system, the space can be effectively utilized and at the same time the light emitting element can be positioned nearer the surface of the original document to be read so that the efficiency of light reception in the light receiving element can be improved.

When the base plate is inclined relative to the optical axis of the optical system, no read failures will be created if the angle of inclination between the base plate and the optical axis of the optical system is set so that the modulation transfer function in the optical system is within a given range.

DETAILED DESCRIPTION OF THE PREFERRED EMBODIMENTS

The present invention will be described in detail with reference to FIGS. 2 to 6.

Figure 1:
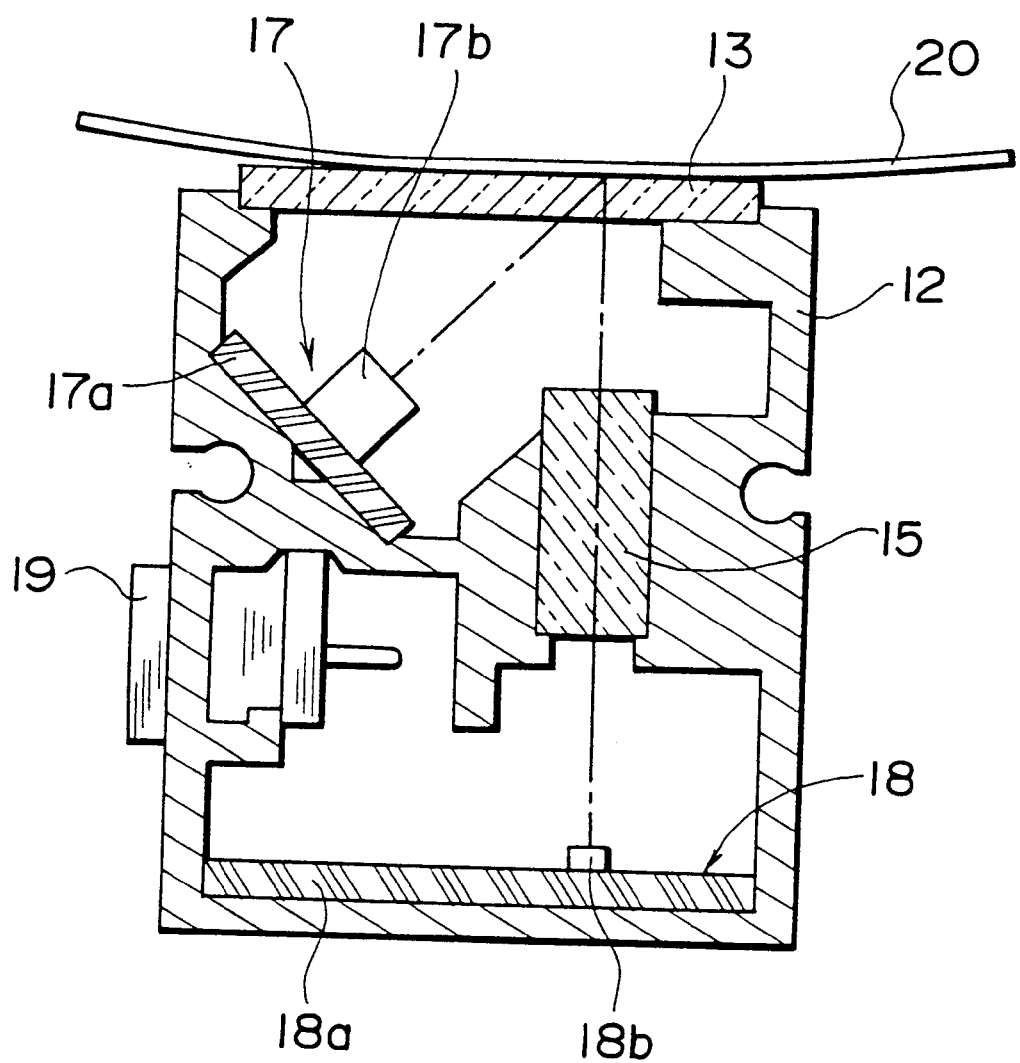
FIG. 1 is a longitudinal section of an image sensor constructed in accordance with the prior art.
Figure 2:
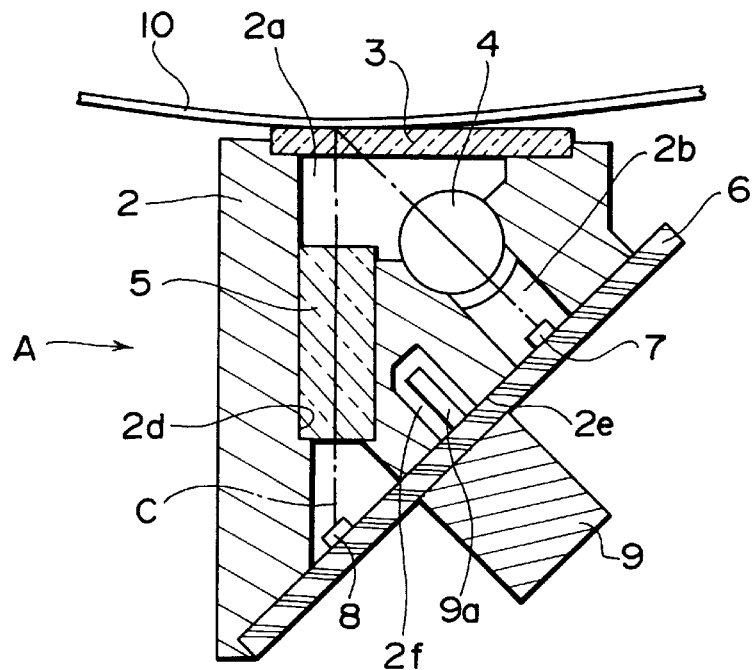
FIG. 2 is a longitudinal section, taken from a side view, of an image sensor constructed in accordance with the present invention.
Figure 4:
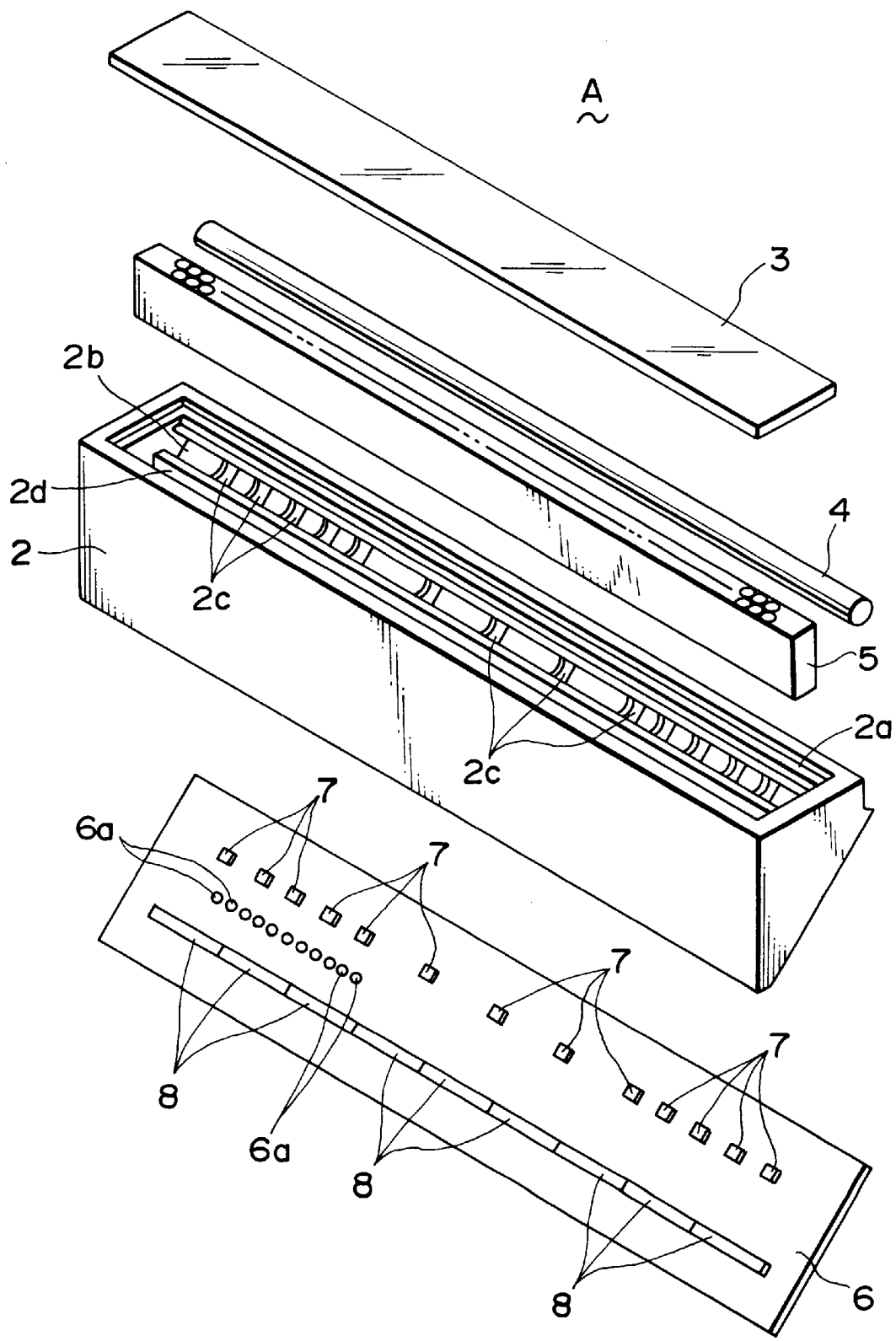
FIG. 4 is an exploded perspective view of the image sensor of the present invention.

As shown in FIGS. 2 and 4, an image sensor A constructed in accordance with the present invention comprises a frame 2 and a transparent glass sheet 3 mounted on the frame 2 at the open top 2a thereof. The frame 2 includes a light passage 2b formed therein. The light passage 2b is divided into a plurality of passage sections by partitions 2c, each of the passage sections corresponding to an LED chip as will be describe later. A cylindrical lens 4 is mounted in the frame 2 at the exit side of the light passage 2b.

The frame 2 also includes a lens array supporting portion 2d formed therein, which supports a gradient index lens array (which will be called simply "lens array") 5. This lens array 5 is disposed perpendicular to the glass sheet 3, with the optical axis C thereof being perpendicular to the glass sheet 3 (or in the vertical direction as viewed in FIG. 2).

The bottom 2e of the frame 2 is inclined 45 degrees relative to the horizontal plane as viewed in FIG. 2. A circuit substrate 6 is mounted on the bottom 2e of the frame 2 so that the circuit substrate 6 is inclined 45 degrees relative to the optical axis C of the lens array 5. The circuit substrate 6 rigidly supports LED chips 7 and photodiode arrays 8 which are connected to a wiring pattern (not shown) on the circuit substrate 6 through wires. The LED chips 7 and photodiode arrays 8 are protectively coated with a transparent resin material (not shown).

Figure 3:
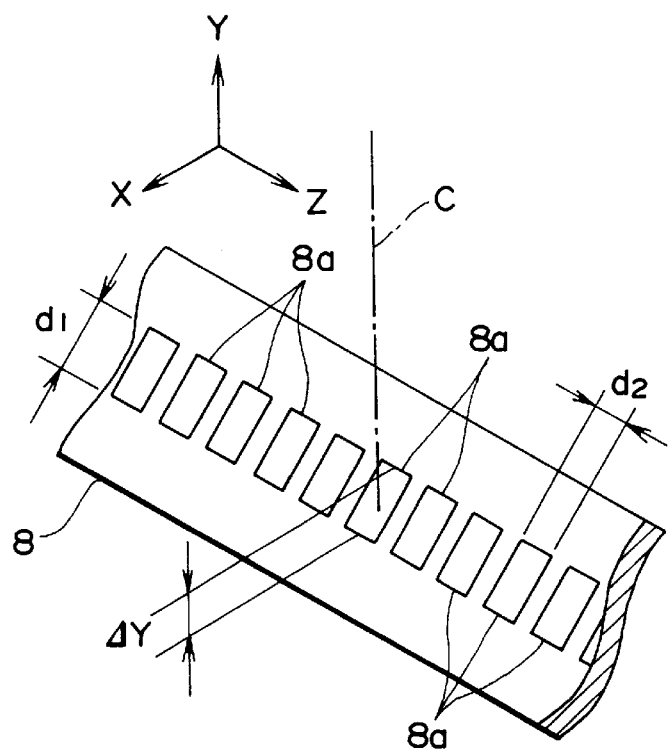
FIG. 3 is an enlarged perspective view of the primary parts of the photodiode array used in the image sensor of the present invention.

When the circuit substrate 6 is mounted in the frame 2, each of the LED chips 7 is positioned within the corresponding light passage section of the light passage 2b while the photodiode arrays 8 are positioned directly below the lens array 5. Each of the photodiode arrays 8 includes a plurality of light receiving portions 8a disposed equidistantly spaced away from one another in the Z-axis direction, as shown in FIG. 3. In the illustrated embodiment, the dimensions $d_1$ and $d_2$ of each of the light receiving portions 8a are equal to 125 microns and 70 microns, respectively.

Referring to FIGS. 2 and 4, the connector 9 mounted on the circuit substrate 6 includes internal terminals 9a which extend inwardly through apertures 6a formed in the circuit substrate 6. The internal terminals 9a are soldered to the wiring pattern (not shown) on the circuit substrate 6. FIG. 2 is a cross-sectional, side view of the image sensor A, which includes a frame 2 having a first wall, a second wall, and third wall extending into and out of the plane of FIG. 2. As seen from FIG. 2, the third wall of the frame 2 includes a recess 2f formed therein to receive the internal terminals 9a of the connector 9.

In such an arrangement, light from each of the LED chips 7 is condensed by the lens 4, arranged between the second and third walls, to irradiate an original document 10 with an angle of 45 degrees. The light is reflected by the original document 10 toward the light receiving portions 8a through the lens array 5, arranged between the first and third walls.

Figure 5:
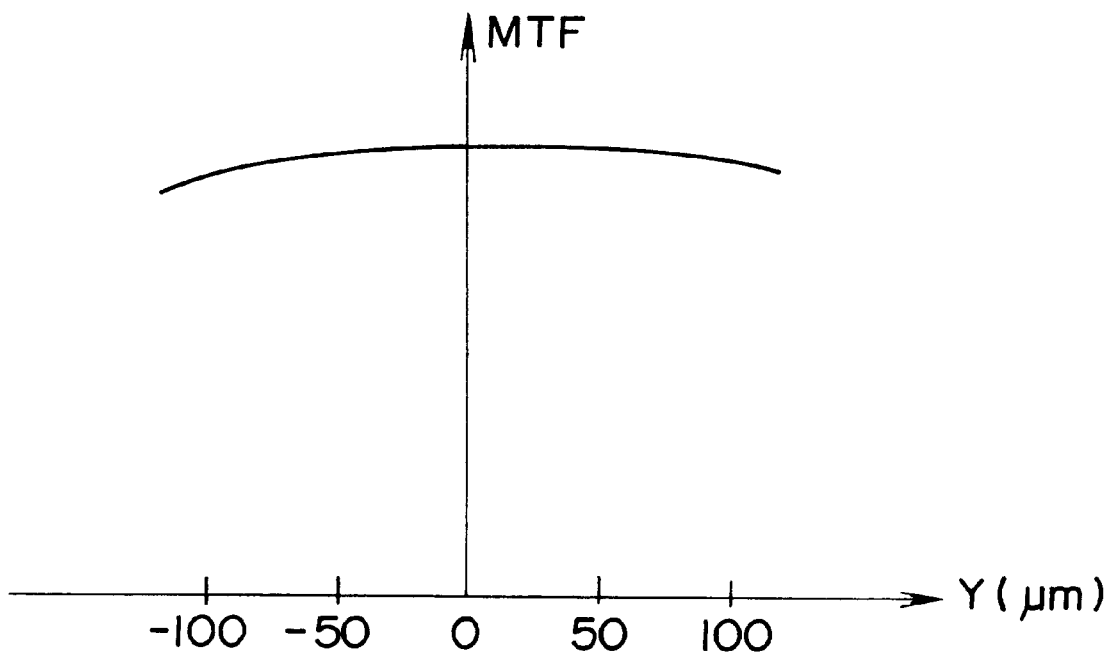
FIG. 5 is a graph illustrating the characteristic of a gradient index lens array usable in the image sensor of the present invention.

Since the light receiving portions 8a are inclined 45 degrees relative to the lens array 5, there will be created a deviation $\Delta Y = 125 \mu m \times \sin 45° =$ about 88 $\mu m$, that is, $\pm 44 \mu m$ in the Y-axis direction. Such a deviation will not practically affect the performance of the image sensor since the entire photodiode arrays 8 is not located on the focus of the lens array 5 and the modulation transfer function (MTF) of the lens array 5 is substantially constant within the range of $\pm 55$ $\mu m$ relative to the deviation in the Y-axis direction, as shown in FIG. 5.

As will be apparent from the foregoing, the image sensor of the present invention includes a single base plate on which light emitting elements, photosensors and connector are mounted, the single base plate being then mounted in a frame. Therefore, the number of assembling steps can be reduced, the number of parts can be reduced as well as the cost, and the image sensor can be made small in size. Since the circuit substrate 6 is positioned inclined 45 degrees relative to the optical axis C of the lens array 5, the image sensor of the present invention can utilize the internal space more efficiently to reduce the size of the entire image sensor. Furthermore, the efficiency of light reception in the light receiving element can be improved since the light emitting element can be located nearer the surface of the original document.

Figure 6:
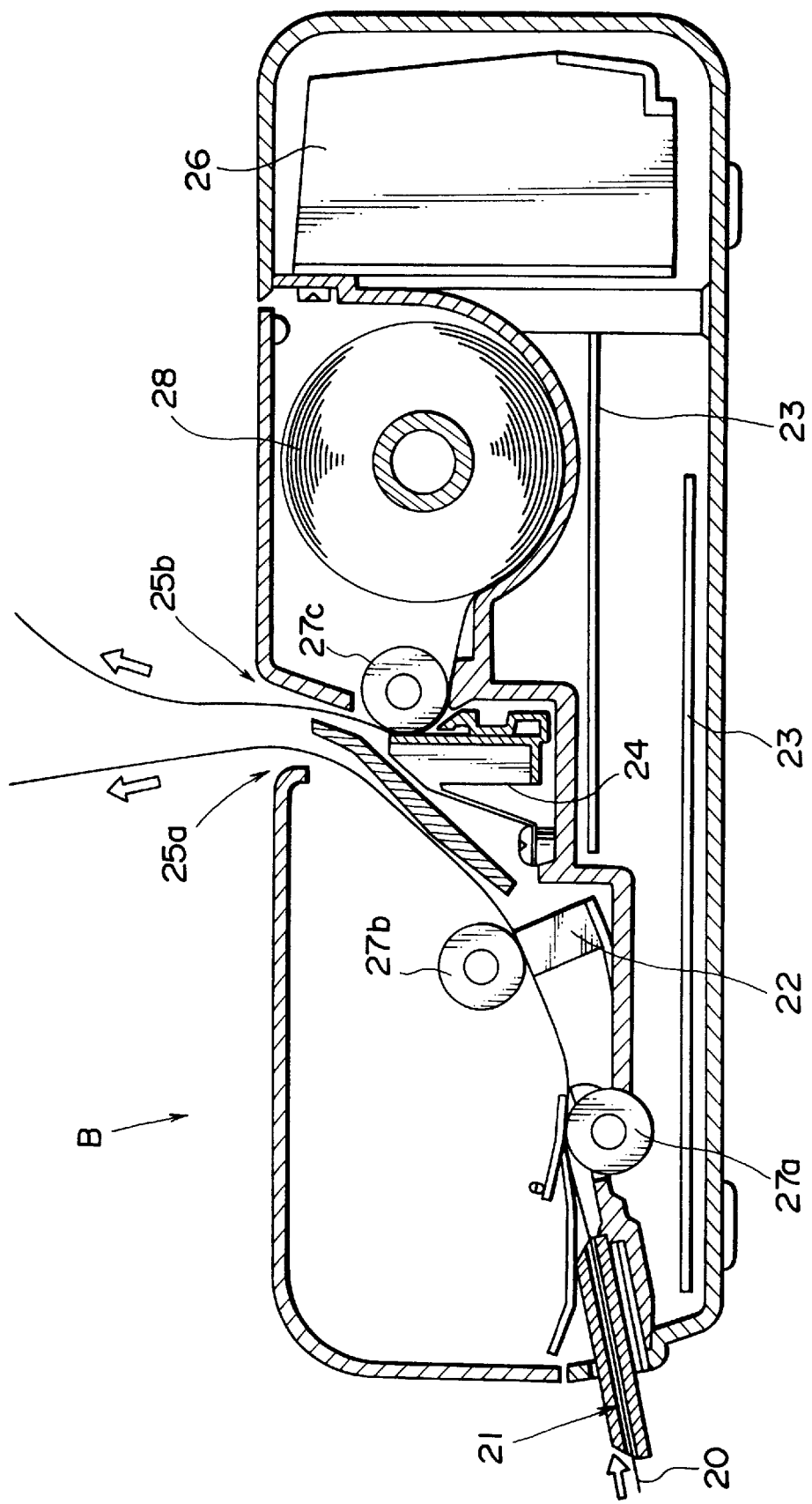
FIG. 6 is a cross-sectional view of the primary parts of a facsimile machine in which the image sensor of the present invention is mounted.

FIG. 6 shows a facsimile machine into which an image sensor constructed in accordance with the illustrated embodiment of the present invention is incorporated.

The facsimile machine B comprises a document supply section 21, an image sensor 22 functioning as an image reader, a control section 23 for controlling the transmission and reception and the entire facsimile machine, a printing section 24, a document discharge section 25 and a power source 26.

As an original document 20 is fed into the facsimile machine B through the document supply section 21, it is conveyed into the interior of the machine by platen rollers 27a and 27b. At this time, the image sensor 22 reads out an image on the document. The information of the image read by the image sensor 22 is outputted to the control section 23 in the form of an electrical signal. The electrical signal inputted into the control section 23 is externally transmitted through a telephone line or the like. After the reading of the image has been completed, the document will be discharged externally through the document discharge section 25a.

When an external signal is received by the control section 23, the latter controls the printing section 24 to print the transmitted image on a print sheet 28. The printed sheet 28 is also discharged outwardly through the document discharge section 25b.

When the image sensor constructed in accordance with the present invention is mounted in the facsimile machine B, the latter can be assembled through a reduced number of assembling steps and with a decreased production cost.

We claim:

1. An image sensor for reading information on an original document by irradiating light onto the original document and converting the light reflected by the document into an electrical signal, said image sensor comprising:

(a) a frame;

(b) a base plate having an inner and an outer side mounted in said frame;

(c) a plurality of light emitting elements mounted on said inner side of said base plate for emitting light to be irradiated onto the original document;

(d) a plurality of light receiving elements mounted on said inner side of said base plate for receiving the light reflected by the document;

(e) a connector mounted on said outer side of said base plate;

(f) a transparent medium which supports the document for irradiating; and (g) an optical system mounted in said frame having an optical axis substantially orthogonal to the medium for directing the reflected light to said light receiving elements, wherein said base plate generally lies in a plane inclined relative to the optical axis of said optical system and wherein said plurality of light emitting elements are positioned relatively closer to said transparent medium than said plurality of light receiving elements to improve light reception by said plurality of light receiving elements.

2. The image sensor as defined in claim 1, wherein the angle of inclination between said base plate and the optical axis of said optical system is equal to 45 degrees.

3. The image sensor as defined in claim 1, wherein the angle of inclination between said base plate and the optical axis of said optical system is within a given range where the modulation transfer function of said optical system is constant.

4. The image sensor as defined in claim 1, further comprising a second optical system mounted in said frame for directing light from said light emitting elements to said medium.

5. The image sensor as defined in claim 1, wherein said connector includes a plurality of terminals, each extending through said base plate and past the inner side thereof.

6. An image sensor comprising:

a frame, said frame having a first wall extending in a first direction, a second wall extending in the first direction, a third wall disposed between said first wall and said second wall and extending in the first direction, and at least one connector connecting said second wall to said third wall;

a transparent medium mounted to said frame and located between said first wall and said second wall;

a base plate mounted to said frame, said base plate having an outer side and an inner side, said inner side contacting at least said first wall and said second wall;

a light emitting element mounted on said inner side of said base plate, said light emitting element being aligned with an area defined between said second wall and said third wall;

a light receiving element mounted on said inner side of said base plate, said light receiving element being aligned with an area defined between said first wall and said third wall; and a first optical system mounted in said frame between said first wall and said third wall, wherein said base plate lies in a first plane and said transparent medium lies in a second plane, said first plane and second plane are convergent and wherein said light emitting element is positioned relatively closer to said transparent medium than said light receiving element to improve light reception by said light receiving element.

7. The image sensor as defined in claim 6, wherein said first plane and said second plane are convergent at an angle of approximately 45 degrees.

8. The image sensor as defined in claim 6, wherein said inner side of said base plate also contacts said third wall.

9. The image sensor as defined in claim 6, wherein said light emitting element comprises a plurality of light emitters.

10. The image sensor as defined in claim 9, wherein said at least one connector comprises a plurality of discreet connectors, each connecting a portion of said second wall to said third wall, so as to form a plurality of passageways between adjacent discreet connectors, respectively; and wherein each light emitter of said plurality of light emitters is aligned with a passageway of said plurality of passageways.

11. The image sensor as defined in claim 6, wherein said first wall includes a first groove extending in the first direction and facing toward said third wall; and wherein said first optical system engages said first groove to ensure proper positioning of said first optical system between said first wall and said third wall.

12. The image sensor as defined in claim 11, wherein said third wall includes a second groove extending in the first direction and facing toward said first wall; and wherein said first optical system engages said second groove to ensure proper positioning of said first optical system between said first wall and said third wall.

13. The image sensor as defined in claim 6, further comprising:

a second optical system mounted in said frame between said second wall and said third wall.

14. The image sensor as defined in claim 13, wherein said second wall includes a first arc-shaped cutout extending in the first direction and facing toward said third wall; and wherein said second optical system engages said first arc-shaped cutout to ensure proper positioning of said second optical system between said second wall and said third wall.

15. The image sensor as defined in claim 14, wherein said third wall includes a second arc-shaped cutout extending in the first direction and facing toward said second wall; and wherein said second optical system engages said second arc-shaped cutout to ensure proper positioning of said second optical system between said second wall and said third wall.

16. The image sensor as defined in claim 6, further comprising:

a communicating connector mounted on said outer side of said base plate and extending away from said outer side of said base plate, said communicating connector being in communication with said light emitting element and said light receiving element.

17. The image sensor as defined in claim 16, further comprising:

a plurality of terminals connected to said communicating connector, said plurality of terminals extending through said base plate and projecting away from said inner side of said base plate toward said third wall.

18. The image sensor as defined in claim 17, further comprising:

a recessed portion formed in said third wall to accommodate said plurality of terminals.

19. An image sensor for reading information on an original document by irradiating light onto the original document and converting the light reflected by the document into an electrical signal, said image sensor comprising:

a frame, said frame having an open top and an open bottom;

a transparent image receiving plate substantially closing said open top of said frame;

a base plate substantially closing said open bottom of said frame;

a light emitting element mounted on a first side of said base facing toward said transparent image receiving plate; and a light receiving element mounted on said first side of said base plate facing toward said transparent image receiving plate, wherein base plate lies in a first plane and said transparent image receiving plate lies in a second plane, said first plane and second plane are convergent and wherein said light emitting element is positioned relatively closer to said transparent image receiving plate than said light receiving element to improve light reception by said light receiving element.

20. The image sensor as defined in claim 19, wherein said first plane and said second plane are convergent at an angle of approximately 45 degrees.

* * * * *